United States Patent [19]

Dann et al.

[11] 3,921,202

[45] Nov. 18, 1975

[54] VIDEOTAPE RECORDER AND REPRODUCER VELOCITY COMPENSATOR APPARATUS

[75] Inventors: Bert H. Dann, Los Altos; Barrett E. Guisinger, Saratoga, both of Calif.

[73] Assignee: International Video Corporation, Sunnyvale, Calif.

[22] Filed: Feb. 4, 1974

[21] Appl. No.: 439,093

[52] U.S. Cl. .................................................. 358/8
[51] Int. Cl.² ........................ H04N 5/76; H04N 9/02
[58] Field of Search .......................................... 358/8

[56] References Cited

UNITED STATES PATENTS

| | | | |
|---|---|---|---|
| 3,428,745 | 2/1969 | Coleman, Jr. et al. | 358/8 |
| 3,504,111 | 3/1970 | Sumida et al. | 358/8 |
| 3,592,961 | 7/1971 | Grace | 358/8 |
| 3,749,826 | 7/1973 | Arimura | 358/8 |

*Primary Examiner*—Richard Murray
*Attorney, Agent, or Firm*—Limbach, Limbach & Sutton

[57] ABSTRACT

A velocity error voltage in a VTR is derived by phase comparison of a selected zero crossing of the off-tape color burst with a reference color subcarrier prior to a one horizontal line delay having a noncritical delay time in the signal path. The DC error voltage controls a ramp voltage which is added to the chrominance error detector voltage for control of a variable delay line in the signal path.

8 Claims, 10 Drawing Figures

VIDEOTAPE RECORDER AND REPRODUCER VELOCITY COMPENSATOR APPARATUS

BACKGROUND OF THE INVENTION

This invention relates to videotape recorder and playback devices (VTR's) and, more particularly, to apparatus for correcting the so-called "velocity" error component of a television signal played back on a VTR. The teachings of the present invention are applicable to all types of rotating head VTR's including both the helical scan and the quadruplex type VTR.

The present invention is one portion of a VTR, portions of which are disclosed in other copending applications assigned to the present assignee, all of which are incorporated herewith by reference:

| Ser. No. | Title | Filed | Inventor(s) |
|---|---|---|---|
| 285,919 | SYNCHRONIZING PULSE PROCESSOR FOR A VIDEO TAPE RECORDER | 9- 1-72 | Bert H. Dann and Nikola Vidovic |
| 285,992 | HELICAL SCAN WIDEBAND TAPE RECORDER APPAR- ATUS AND METHOD | 9- 1-72 | Barrett E. Guisinger |
| 285,924 | FM PULSE AVERAGING DEMODULATOR | 9- 1-72 | Bert H. Dann |
| 285,917 | VIDEO TAPE RECORDER METHOD AND APPARATUS | 9- 1-72 | Kenneth Louth |
| 314,734 | TECHNIQUE FOR DETECT- ING LONG DURATION PULSES FROM A TRAIN OF SHORT DURATION PULSES | 12-13-72 | Nikola Vidovic |
| 320,092 | PASSIVE PEAK DETECTOR AND LEVEL SHIFTER | 1- 2-73 | Nikola Vidovic |
| 354,227 | MAGNETIC TAPE TRANSPORT SYSTEM | 4-25-73 | Frank S.C. Mo and Vernon Natwick |
| 355,220 | VIDEOTAPE RECORDER AND REPRODUCER VELOCITY COMPENSA- TOR APPARATUS | 4-27-73 | Barrett E. Guisinger and Bert H. Dann |
| 355,758 | VIDEO PROCESSING CIRCUIT | 4-30-73 | Nikola Vidovic |
| 355,781 | PHASE SHIFTER APPARATUS | 4-30-73 | Nikola Vidovic |
| 356,380 | VIDEO TAPE RECORDER METHOD AND APPARATUS | 5- 2-73 | Kenneth Louth |
| 356,839 | VIDEO TAPE RECORDER EDITING APPARATUS | 5- 3-73 | Bert H. Dann |

In the videotape recorder (VTR) art the requirements of broadcast quality color television signal recording and reproduction has placed extremely stringent tolerances on the time base stability of the VTR. Modern color VTR's intended for broadcast use include several sub-systems which contribute to a relatively stable reproduced television signal: capstan and head drum servo systems for resolving large phase errors between the VTR signal and a reference signal and electronic circuits for resolving the smaller remaining phase errors left uncorrected by the servo systems. Typical VTR's employ two controllable variable delay lines in series: the first, a portion of a sub-system generally referred to as the monochrome time base corrector, is controlled by an error signal derived by comparing the phase of off-tape horizontal sync signals to reference horizontal sync signals; the second, a portion of a sub-system generally referred to as the chrominance (or color) time base corrector, provides a vernier correction and is controlled by a phase comparison between the off-tape chrominance sub-carrier (color burst) and the reference chrominance sub-carrier.

The effect of the monochrome and chrominance time base correctors is to produce a phase change in the VTR off-tape television signal so as to bring it in "precise" phase coincidence (within several nanoseconds) with the reference sync and burst signals. The phase corrections are made to the VTR off-tape television signal at the start of each horizontal line and the same correction is maintained by the time base correctors throughout the line.

It was discovered, however, that the correcting of the VTR off-tape signal at each horizontal line is not adequate. Although the VTR signal is in phase with the reference at the start of a line, the VTR off-tape signal phase departs from the reference phase through the horizontal line time so that by the end of the horizontal line there is an unacceptable phase error. Fortunately, the progressive phase error through the horizontal line is essentially linear. Thus, a further time base error correction is provided, known as "velocity" compensation, so named because it was believed to result from variations in head drum velocity due to mechanical offsets, etc. It appears that the so-called "velocity" error may also be a result of waves set up in the tape when struck by the rapidly moving video heads. Nevertheless, the exact cause of "velocity" error is of no importance to the present invention.

Because the "velocity" error is essentially a straight line error, the standard solution is to add a ramp having the proper slope to the voltage in the color time base corrector which controls the vernier delay time. Thus, the delay line is changed progressively throughout each horizontal line and the last significant phase error is compensated. Discussions of time base correction in VTR's is found in *Magnetic Recording* by Charles E. Lowman, McGraw-Hill, 1972; "A Short History of Televison Recording: Part II" by Albert Abramson, *Journal of the SMPTE*, March 1973, pp. 188–198; "A New Technique for Time-Base Stabilization of Video Recorders" by Charles H. Coleman, *IEEE Transactions on Broadcasting*, March 1971, pp 29–36; U.S. Pats. Nos. 3,213,192 (Jensen), 3,428,745 (Coleman et al.); and 3,504,111 (Sumida et al.).

Prior art velocity compensators are classifiable into two groups. In the type disclosed in the Coleman et al patent (3,428,745) the VTR off-tape horizontal sync pulses are compared to reference horizontal sync pulses and the phase error between consecutive horizontal lines is stored for one head wheel rotation period. This approach assumes that the same or nearly the same velocity error occurs when the head wheel subsequently rotates to the same position. Storage means are required for the number of horizontal lines covered by a head wheel rotation (64 in the case of the "quadruplex" recorder).

In another type of velocity compensator as disclosed in the Coleman IEEE Transactions article and the Sumida et al. patent (U.S. Pat. No. 3,504,111), a one horizontal line delay is placed in the VTR off-tape signal path and the phase of the color burst (chrominance subcarrier) before and after the delay is compared. This approach has the advantage of avoiding storage of the error measurements since the correction may be immediately applied to the one line delayed signal. However, in order that the velocity phase error signal be accurate, the dealy line must be one horizontal line period within great precision. Either a very expensive delay line must be used or a complex means for maintaining calibration of the delay line is required. A further complication with this approach is that the subcarrier phase is not constant at each line. In NTSC signals, for example, the subcarrier shifts 180° each line. The shift is even more complex in the PAL color system. Hence, further circuitry is required in order to compensate for the shifted subcarrier in adjacent lines.

To achieve the optimum velocity error correction (1) the system should correct the actual horizontal television line having the measured error and (2) the system should detect the error by comparing the off-tape color burst against a reference subcarrier. The use of the off-tape color burst instead of the horizontal sync edges is preferable because a color burst can be derived off-tape that is cleaner and better filtered (less contaminated by noise) than an off-tape sync pulse. Also a reference color subcarrier having greater stability than a reference sync pulse is more easily provided.

The present invention provides the advantages of actual correction with color burst comparison while doing so in a simpler and more inexpensive manner than in the prior art.

SUMMARY OF THE INVENTION

In accordance with one embodiment of the present invention, the off-tape color burst is compared to a continuously generated reference color subcarrier prior to a one-line delay in the off-tape signal path and the detected error is then added to the chrominance error signal after the one-line delay for controlling the vernier delay line. Since the velocity error is derived by comparison of the off-tape color burst to the reference color subcarrier, the one line delay need not have a precision delay time. Thus a one-line delay line is used which requires no periodic recalibration. Also, comparison of the off-tape color burst to a reference subcarrier rather than to a delayed off-tape color burst result in improved performance because the reference is noise-free.

In accordance with the teachings of this invention a selected zero crossing from each off-tape color burst is used to sample a plurality of ramps derived from the reference subcarrier. A plurality of "window" pulses are also derived from the reference subcarrier to insure the selection of valid samples in each pair of adjacent lines. For example, if two ramps are generated from the reference subcarrier in phase and 180° out of phase, respectively, and having 90° retrace times, the "windows" are timed to center on the remaining 270° of each ramp. Each sample, which occurs at a selected off-tape burst zero crossing, samples both ramps in separate channels and a difference voltage is derived on a line to line basis, indicating the velocity error. Each channel will have the same difference voltage unless one of the two ramps are sampled during retrace. The "windows" function in a logic arrangement to reject any such erroneous measurements provided that the VTR velocity error does not exceed the valid ramp on either side of the windows. In the examples given here, a 45° of subcarrier error is permissible and in practice is a larger velocity error than would be encountered normally. This arrangement is, in effect, a four quadrant phase detector.

It will be appreciated that the absolute phase of the subcarriers is not important and that the system is only concerned with the relative phase changes from line to line because the difference voltages are based on relative changes in the sampling point along each ramp. Also, it will be appreciated that the reference subcarrier need not bear any fixed relationship to other reference subcarriers in the VTR, although it is convenient to do so. The only restriction on the reference subcarrier is that it be stable well within the expected velocity error.

These and other advantages of the present invention will be better understood as this specification and drawings are read and understood.

DETAILED DESCRIPTION OF THE PREFERRED EMBODIMENTS

Figure 1:
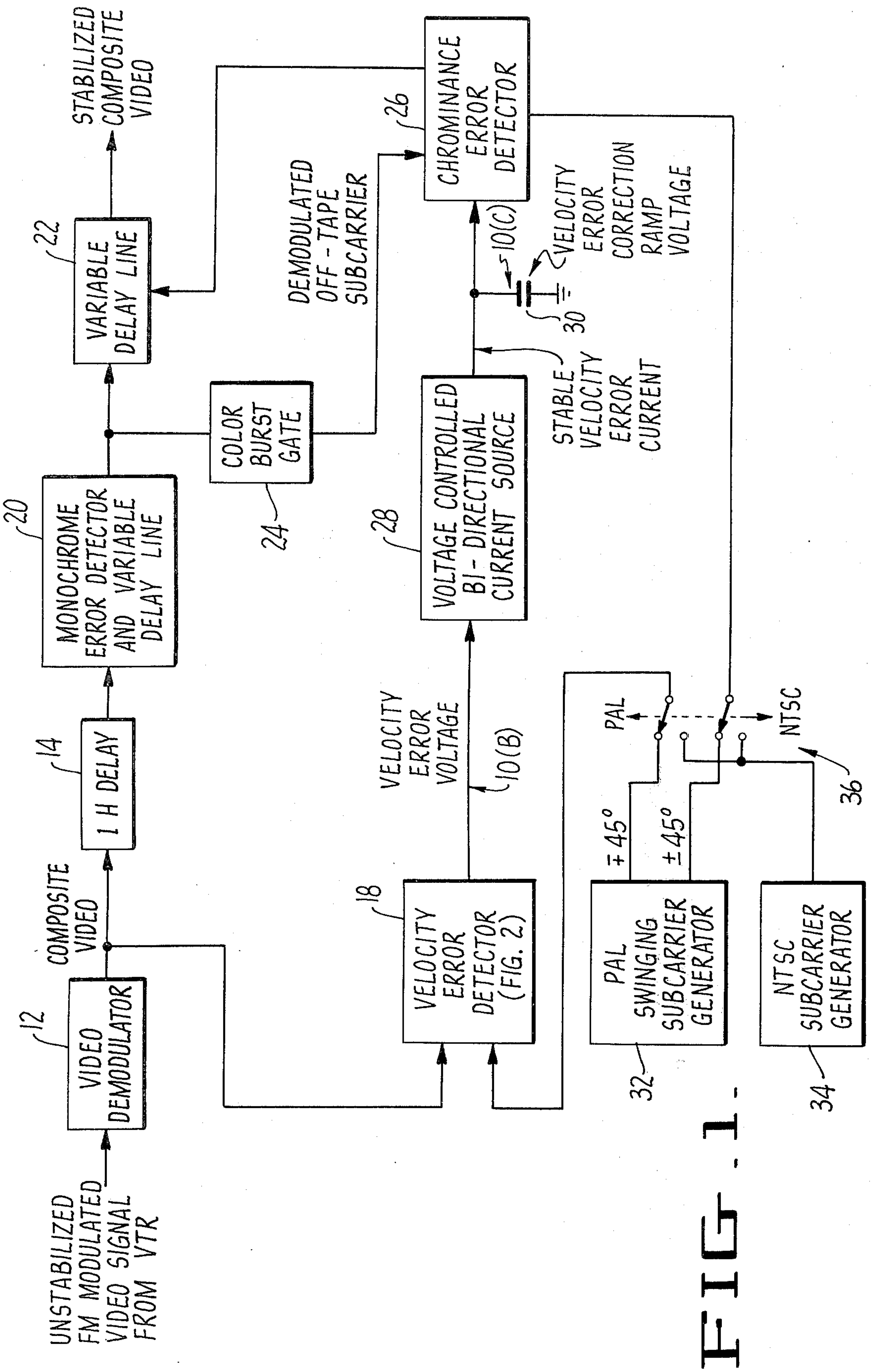
FIG. 1 is a block diagram of an overall phase correction system embodying the invention for color video playback in a VTR.

FIG. 1 shows in block diagrammatical form the overall color phase compensation system for a VTR according to the present invention. The unstabilized off-tape signal, which is typically a frequency modulation or pulse-interval modulation signal, is applied to a video demodulator 12. One preferred form of such a demodulator is disclosed in said copending application of Bert H. Dann, Ser. No. 285,924, filed Sept. 1, 1972. A composite color video signal is applied to a one horizontal line delay (hereinafter referred to as a "1H delay") 14 and to a conventional sync stripper 16. The composite video signal can be according to any of the following world color television standards: NTSC, PAL, and PAL-M. The invention is equally applicable to all such systems. The 1H delay 14 need not be a precision delay line, for example, a delay of one horizontal line time plus or minus 0.5 microseconds is suitable. A delay line of this type is relatively inexpensive compared to precision delay lines or complex arrangements for continually recalibrating a delay line.

Figure 2:
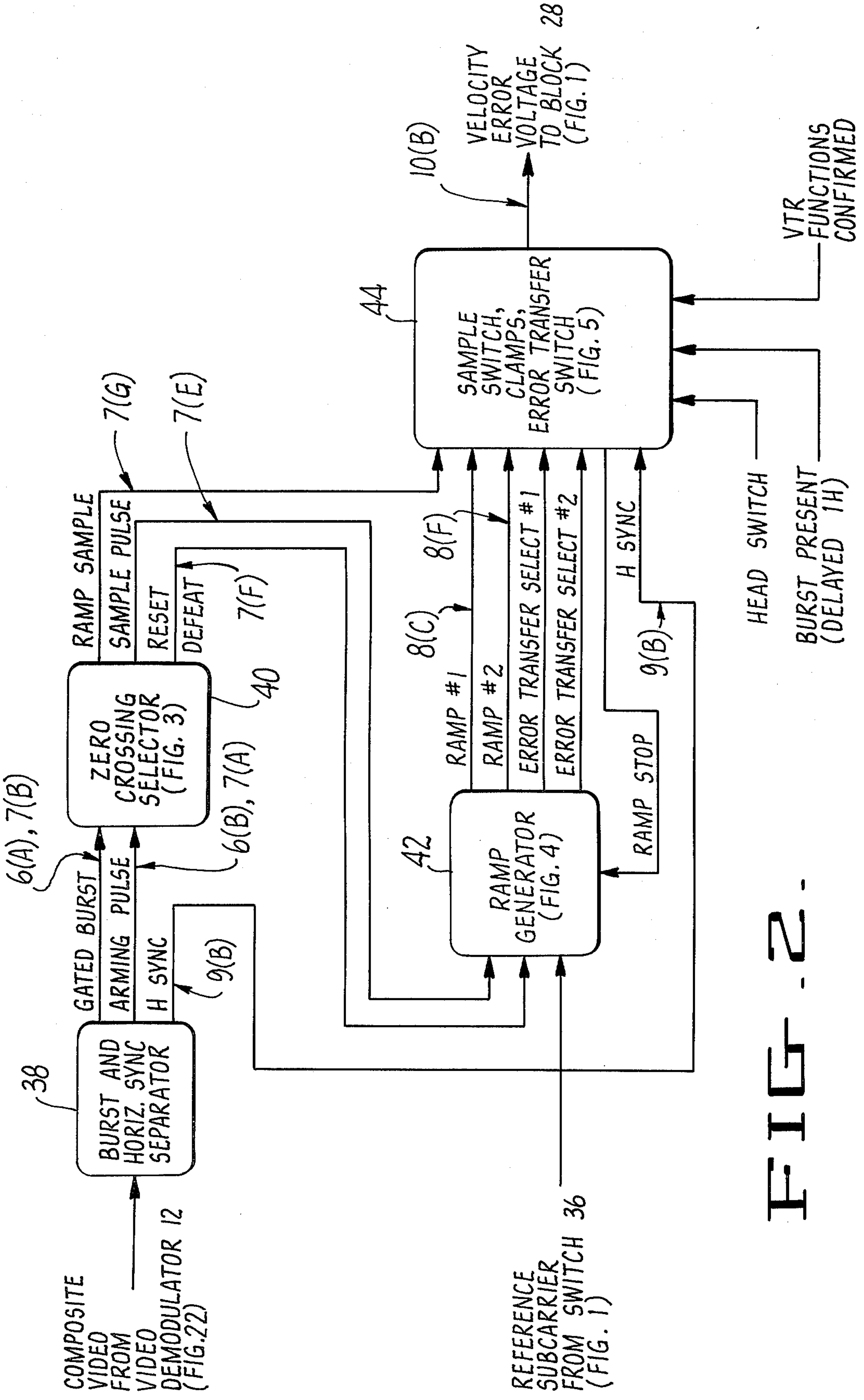
FIG. 2 is a block diagram showing the velocity error detector of FIG. 1 in greater detail.

A velocity error detector 18, shown in greater detail in FIG. 2, receives the raw, uncorrected composite video signal from video demodulator 12. The composite video signal is uncorrected and contains all time base and velocity errors inherent in the particular VTR. Detector 18 also receives a reference color subcarrier input from switch 36. For purposes of illustration, a PAL swinging subcarrier generator 32 is shown having ∓45° and ±45° outputs. As is well known the swinging burst phase alternates from line to line in PAL (or PAL-M), hence when processing PAL (or PAL-M) signals, switch 36 is thrown to apply the ∓45° phase to detector 18, which operates prior to 1H delay 14, and the ±45° phase to the chrominance error detector 26, described below, which operates after the 1H delay. When processing NTSC signals, switch 36 is thrown to apply the NTSC subcarrier to detector 26. It will be apparent that a particular VTR will likely have either NTSC or PAL (or PAL-M) facilities and not both. Detector 18 provides a DC output voltage which is updated during the burst time of each horizontal line. The DC voltage output corresponds to the difference in phase error between the selected off-tape color burst zero crossing in consecutive horizontal lines, and the reference color subcarrier which is a direct indication of the "velocity" error along that horizontal television line.

That velocity error voltage relates to the real time off-tape horizontal line that just ended, hence, the 1H delay 14 is used to delay the composite color video signal so that the measured error for that line is actually used to correct the same line.

The 1H delay 14 output is applied first to a conventional monochrome error detector and variable delay line 20. Such devices are well known in the art and are sometimes referred to as a coarse time base error corrector. Ordinarily such units compare off-tape horizontal (in this case, delayed 1H) to reference horizontal and use the detected phase difference to electronically control a delay line in the composite signal path. The output signal from block 20 is thus stabilized sufficiently to provide an acceptable monochrome signal. It should be noted that this correction assures that the beginning of each horizontal line is nearly in phase with the reference horizontal and thus does not provide correction for progressive phase error through the horizontal line which is provided by "velocity" compensation.

The output of block 20 is applied to the chrominance or vernier time base error corrector comprising a variable delay line 22, a color burst gate 24 and a chrominance error detector 26. Detector 26 compares the phase of the off-tape chrominance subcarrier to a reference chrominance subcarrier from generators 32 or 34 via switch 36 and provides an error signal to adjust delay line 22 to correct any remaining phase error at the beginning of the horizontal line.

The velocity error measurement from detector 18 is an indication of the phase error at the end of the horizontal line. The phase error at the beginning of the horizontal line is corrected by the monochrome and chrominance error detectors and delay lines. Thus, as is well known in the art, the velocity compensating signal is properly a linear ramp beginning at zero at the start of the horizontal line and reaching the measured error at the end of the line. A preferred embodiment to implement this approach in the present invention is to apply the DC velocity error voltage from detector 18 to a voltage controlled bi-directional current source 28, which is described in greater detail in said application of Barrett E. Guisinger and Bert H. Dann, Ser. No. 355,220, filed Apr. 27, 1973. Current source 28 generates a highly stable current having a polarity and amplitude controlled by the DC input voltage. The stable output current from source 28 charges a capacitor 30. The resulting ramp voltage on the capacitor shown in FIG. 10(C) is added to the chrominance phase error voltage for control of delay line 22. In order to provide an accurate velocity error voltage ramp on the capacitor 30, it is extremely important that the current from source 28 remain constant in response to a given DC input voltage in order that the ramp voltage is accurate. Relatively small deviations and perturbations in the ramp voltage can result in erroneous phase corrections by delay line 22.

Referring now to FIG. 2, which shows in a more detailed block diagram form the velocity error detector of block 18 in FIG. 1. The composite video signal from the video demodulator 12 is applied to a burst and horizontal sync separator 38, which is of conventional design. Separator 38 provides a gated burst pulses shown in FIGS. 6(A) and 7(B), arming pulses shown in FIGS. 7(B) and 8(A), and horizontal sync pulses shown in FIG. 9(B). As best seen in FIGS. 6(A) and 6(B), the arming pulse leading edge occurs toward the end of the color burst envelope and the trailing edge falls after the end of the color burst envelope. Prior art devices for providing a gated burst signal and horizontal sync signals from a composite video signal are well known. The arming signal may be simply derived from the burst gate circuitry by means of a delay or monostable multivibrator, for example. As will be explained further below, the leading edge of the arming pulse is closely related to the selection of an off-tape zero crossing of the color burst. It is desirable to select a zero crossing toward the end of the color burst envelope in order to assure that a relatively noise-free zero crossing is available. In typical devices for providing a gated burst a narrow band filter is used such that the burst envelope does not attain its maximum amplitude until toward the end of the burst. Also, one is assured that most transients in the burst gating circuitry have subsided by the end of the burst. The arming pulse and the burst zero crossings are non-synchronous.

Figure 3:
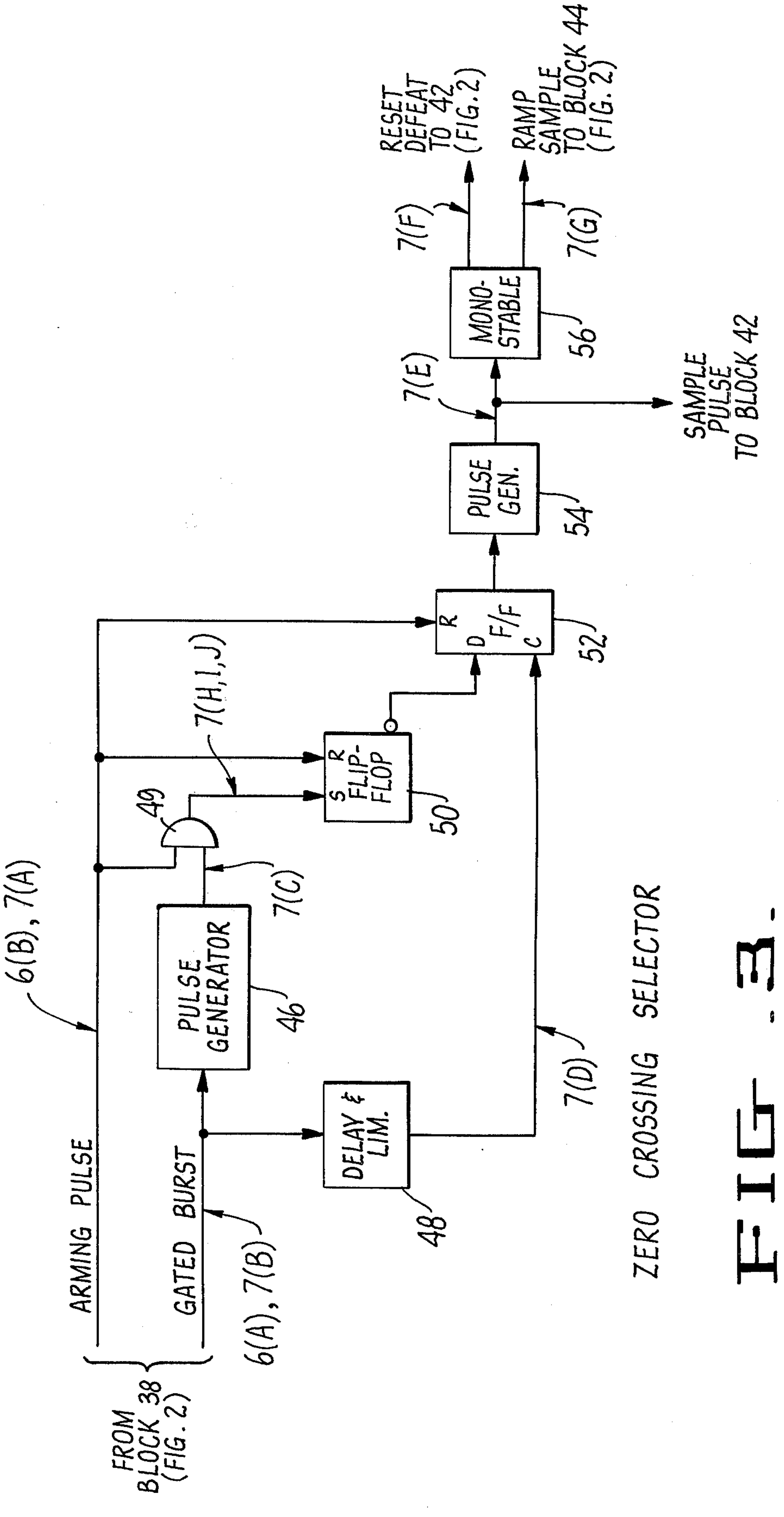
FIG. 3 is a block diagram showing the zero crossing selector of FIG. 2 in greater detail.

The gated bursts and arming pulses are applied to a zero crossing selector 40, which is shown in greater detail in FIG. 3. The zero crossing selector provides for the selection of the next zero crossing of the color burst following the occurrence of the arming signal. The selector 40 includes anti-race circuitry to prevent a race condition when a zero crossing and the arming signal occur closely in time. Selector 40 generates a ramp sample pulse, shown in FIG. 7(G), for sampling a ramp generated from the reference subcarrier as will be explained further below. A narrower sample pulse coincident with the leading edge of the ramp sample pulse and shown in FIG. 7(E) and a reset defeat pulse shown in FIG. 7(F) are applied to ramp generator 42. The ramp generator also receives the reference subcarrier input from switch 36 and a ramp stop signal from block 44 that will be described further below. Ramp generator 42, which is shown in greater detail in FIG. 4, generates first and second ramps, shown in FIGS. 8(C) and 8(F) that are 180° out of phase with each other. Each ramp consists of a retrace portion comprising 90° of the reference subcarrier and a linear ramp portion which comprises 270° of the reference subcarrier. These ramps are applied to block 44 which includes a sample switch, a clamp and an error transfer switch. Block 44 is shown in greater detail in FIG. 5.

Block 42 also applies error transfer select signals No. 1 and No. 2 to block 44 for selection of a valid error signal as will be explained further below. The ramp sample pulse from zero crossing selector 40 is also applied to block 44 and through a buffer as a ramp stop signal to the ramp generator 42 so that the ramps are stopped when sampling takes place. The horizontal sync pulses from block 38 are also applied to block 44. Block 44 also receives certain other signals including the head switching signals, pulses indicating the presence of each color burst (delayed one horizontal line) and signals confirming the operation of certain VTR functions. The head switching signals are derived from other circuitry such as that described in said copending application of Barrett E. Guisinger, Ser. No. 285,922, filed Sept. 1, 1972. The output of block 44 is the velocity error voltage, shown in FIG. 10(B), which is applied to block 28 (FIG. 1).

Figure 6:
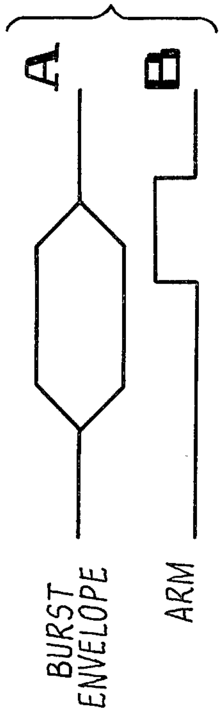
FIG. 6 (A–B) is a series of waveforms useful in understanding the zero crossing selector of FIG. 3.
Figure 7:
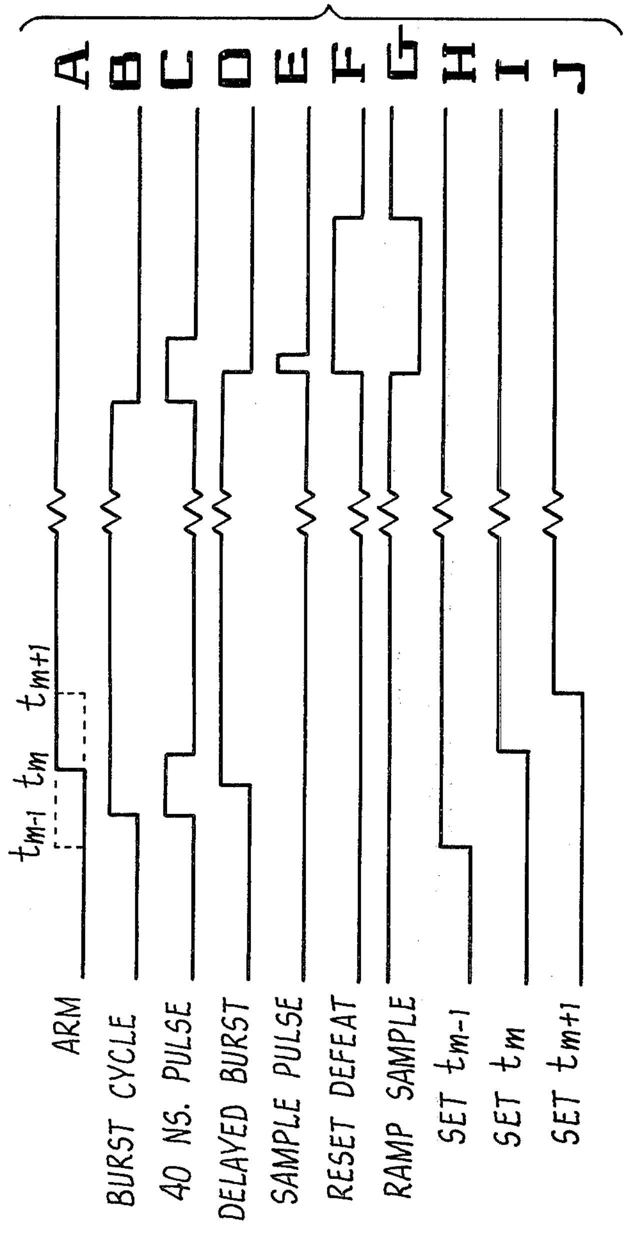
FIG. 7 (A–J) is a further series of waveforms useful in understanding the zero crossing selector of FIG. 3.

Referring now to FIG. 3 wherein the details of the zero crossing selector 40 of FIG. 2 are shown. FIGS. 6 and 7 depict waveforms that are useful in understanding the operation of the zero crossing selector. The time scale of FIG. 7 is greatly expanded in comparison to that of FIG. 6. For example, in FIG. 9(A) one burst envelope is shown having a length of 2.4 to 2.8 microseconds and containing in the order of 8 to about 11 or 12 cycles. Whereas, in FIG. 7(B) one burst cycle is shown.

The gated burst signals (FIGS. 6(A), 7(B)) are applied to a pulse generator 46 which generates a short pulse, for example, 40 nanoseconds, at each zero crossing of the burst. These pulses shown in FIG. 7(C) are applied to one input of AND-gate 49. The gated burst signals are also applied to a delay and limiter 48. The delay period is chosen to be about half the length of the pulses from generator 46 or about 20 nanoseconds in this example. The delayed and limited (thus becoming a square wave) burst cycles, shown in FIG. 7(D), are applied to the clock input of a flip-flop 52 which operates in the manner that when the data input goes low the next time the clock input goes low it is clocked out. The arming pulse is applied to the other input and AND-gate 49 and to the reset input of flip-flops 50 and 52. The output of AND-gate 49 is applied to the set input of flip-flop 50. The not output of flip-flop 50 is applied to the data input of flip-flop 52. The output of flip-flop 52 is applied to a pulse generator 54 which generates a sample pulse of a 10 nanosecond width, for example, which occurs, with one qualification, at the first negative going zero crossing of the delayed burst subsequent to the arming signal leading edge, as shown in FIG. 7(E). Although the circuit is shown operating on the negative going zero crossing, the positive going zero crossing could be used (but not both). The sample pulse is applied to block 42 and to a monostable multivibrator 56, which generates two longer pulses having their leading edges coincident with the leading edge of the sample pulse. Each of these pulses is 100 nanoseconds, for example, and comprises a positive going reset defeat pulse, shown in FIG. 7(F) and applied to block 42 and a negative going ramp sample pulse, shown in FIG. 7(G) and applied to block 44.

Considering now the operation of FIG. 3, the arming pulse (FIG. 7(A)) may occur at any time relative to a zero crossing of the burst (FIG. 7(B)). The arming pulse sets flip-flop 50 unless it falls within the 40 ns. pulse of generator 46 (FIG. 7(C)), in which case it is set following the 40 ns. pulse time. If flip-flop 50 is set then the next negative going zero crossing of the delayed burst generates the sample pulse (FIG. 7(E)). Thus, a race condition which might occur when the arming pulse and burst zero crossing are nearly the same in time is avoided. FIGS. 7(H–J) show the respective set pulses (outputs of AND-gate 49) for arming pulses (FIG. 7(A)) at $t_{m-l}$, $t_m$ and $t_{m+l}$.

Figure 4:
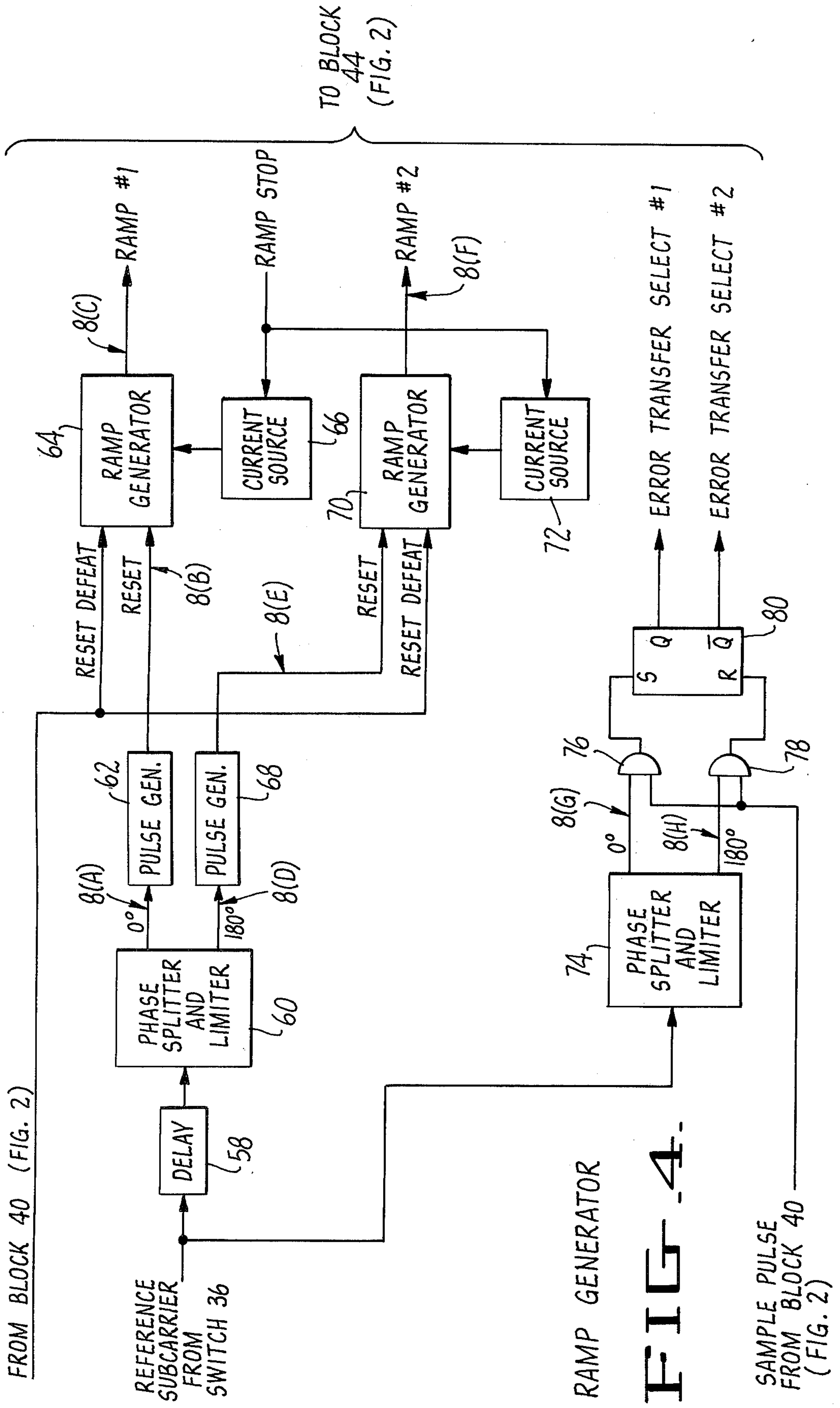
FIG. 4 is a block diagram showing the ramp generator of FIG. 2 in greater detail.
Figure 8:
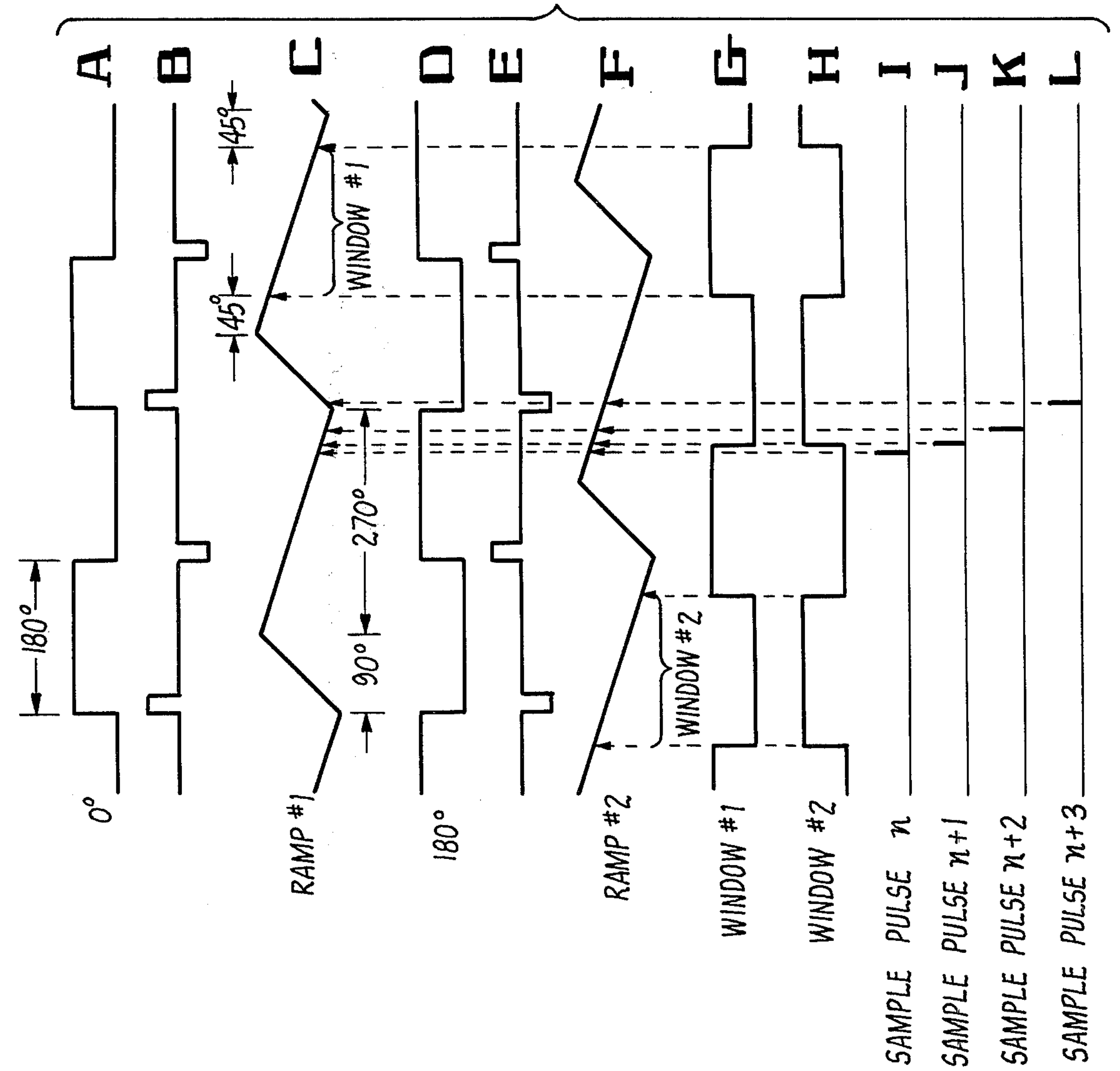
FIG. 8 (A–L) is a series of waveforms useful in understanding the ramp generator of FIG. 4.

Referring now to FIG. 4 wherein the ramp generator 42 of FIG. 2 is shown in greater detail. The waveforms of FIG. 8 are particularly useful in the understanding of the operation of FIG. 4. The reference subcarrier from switch 36 is applied to a phase splitter and limiter 74 which generates first and second window pulses as shown in FIGS. 8(G) and 8(H) 180° out of phase with each other. Each cycle of the window pulses are 360°of the reference subcarrier. The reference subcarrier is also applied through a delay 58 to a further phase splitter and limiter 60. The delay is approximately 225° of the reference subcarrier and its purpose is to center the window pulses on the linear portions of the ramps to be generated from the two phases of the limited subcarrier provided by block 60, shown in FIGS. 8(A) and 8(D). The two phases of the limited reference subcarrier are applied to respective pulse generators 62 and 68 which generate pulses at each zero crossing as shown in FIGS 8(B) and 8(E). These pulses function to reset ramp generators 64 and 70. The reset pulses thus initiate the retrace period of ramps 1 and 2 shown in FIGS. 8(C) and 8(F). The ramp generators also receive the reset defeat pulse from block 40 of FIG. 2 to prevent resetting of a ramp in the event that a sample is being taken toward the end of a ramp. It will be apparent that in the case where a ramp is reset that the next consecutive ramp is not generated. However, this has no effect on the operation of the system because the next sample is not taken until the next consecutive horizontal line has been completed.

It will be observed from FIG. 8 that the positive going portions of the window No. 1 pulses of FIG. 8(G) "window" the central 180° of the linear portion of ramp No. 1 shown in FIG. 8(C). There is thus an additional 45 degrees of ramp available on either side of the window. In a similar manner window No. 2 pulses of FIG. 9(H) "window" the central linear portion of ramp No. 2 shown in FIG. 8(F).

The sample pulses from block No. 40 of FIG. 2 are applied to first and second AND gates 76 which receive, respectively, the two trains of window pulses. Assume, consecutive sample pulses on consecutive lines as shown in FIGS. 8(I) through 8(L). The sample pulse n occurs when the window No. 1 pulse is high and thus RS flip-flop 80, which receives the output of AND gates 76 and 78 at its set and reset inputs, respectively, will be set and thus the Q output will be high. As will be explained below, this applies the error transfer select No. 1 signal to block 44. Sample pulse $n+1$ (FIG. 8(J)) occurs at the transition of window No. 1 and window No. 2. Thus, a race condition exists at flip-flop 80. However, as will be understood, it does not matter if the flip-flop is set or reset. Sample pulse $n+2$ (FIG. 8(K)) occurs during window No. 2 and thus the $\bar{Q}$ output of flip-flop 80 is high providing an error transfer select No. 2 signal to block 44. The use of the error transfer select signals will be explained below. Sample pulse $n+3$ (FIG. 8(L)) also occurs during window No. 2 and causes the $\bar{Q}$ output of flip-flop 80 to be high. It will be noted that sample pulses $n$, $n+1$, and $n+2$ all occur during the linear portions of both ramps. Whereas, sample pulse $n+3$ occurs during the retrace portion of ramp No. 1. Circuitry in block 44 to be described below provides the difference of each successive sample on each ramp. Thus, all but the difference of the samples for sample pulse $n+3$ on ramp No. 1 will be valid. However, as will be understood, by the use of the error transfer select signals only valid sample data are selected. FIG. 8 will be referred to further in the detailed discussion of block 44 in FIG. 5. It is to be understood that sample pulses $n$, $n+1$, $n+2$ and $n+3$ of FIG. 8 (I–L) occur in consecutive horizontal lines and thus sample corresponding subcarrier ramps (FIGS. 8(C) and 8(F)) each displaced in time by approximately one horizontal line. Only one set of subcarrier ramps are shown for the purposes of clarity.

Ramp generators 64 and 70 are conventional circuits driven by current sources 66 and 72. During each ramp sample time (see FIGS. 7(G) and FIG. 3) the ramps are stopped by inactivating the current sources 66 and 72. This is a conventional technique used in ramp sampling circuits in order that the ramp does not change values during a sample.

Figure 5:
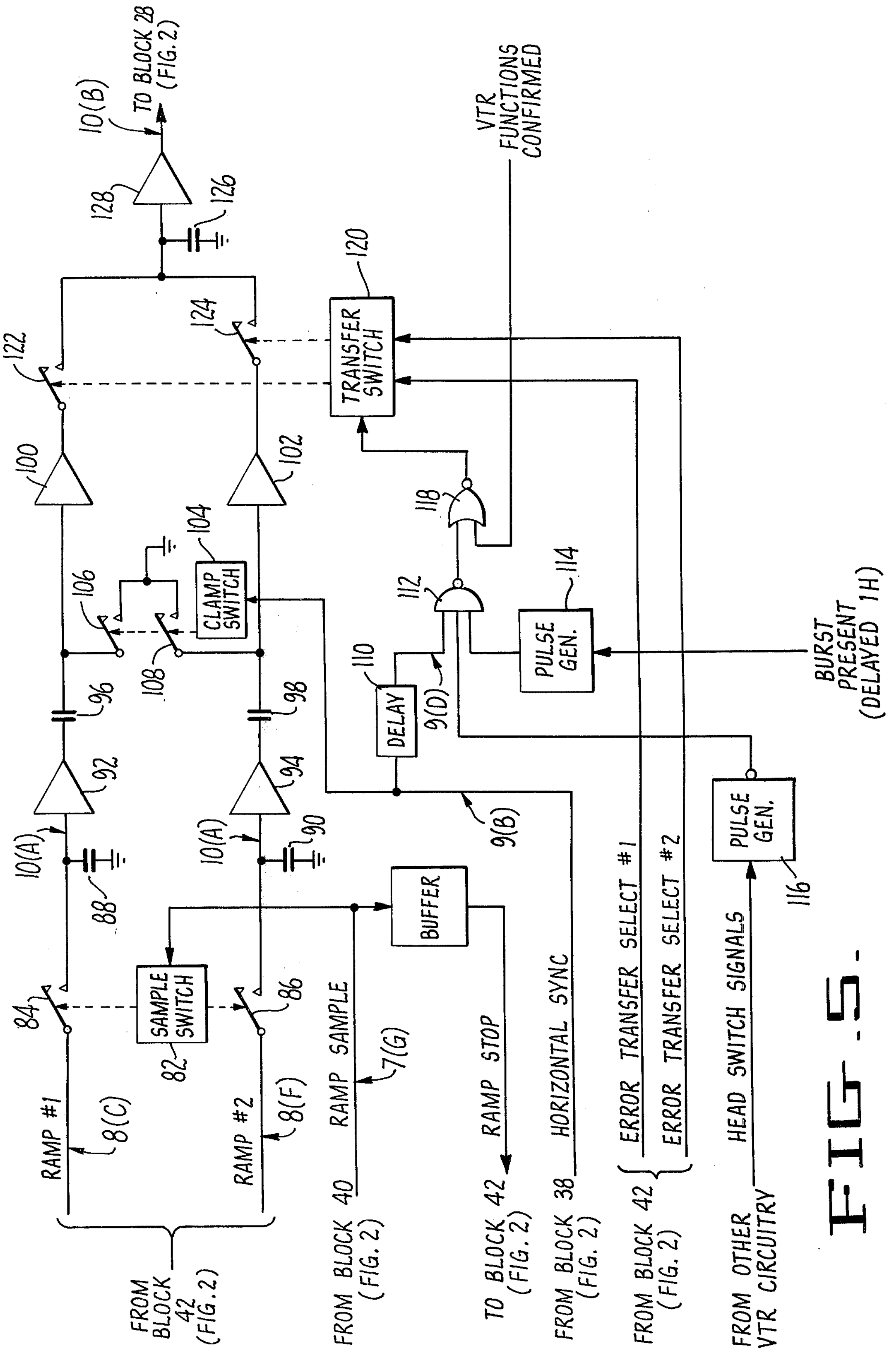
FIG. 5 is a block diagram showing the sample switch, clamps and error transfer switch of FIG. 2 in greater detail.
Figure 10:
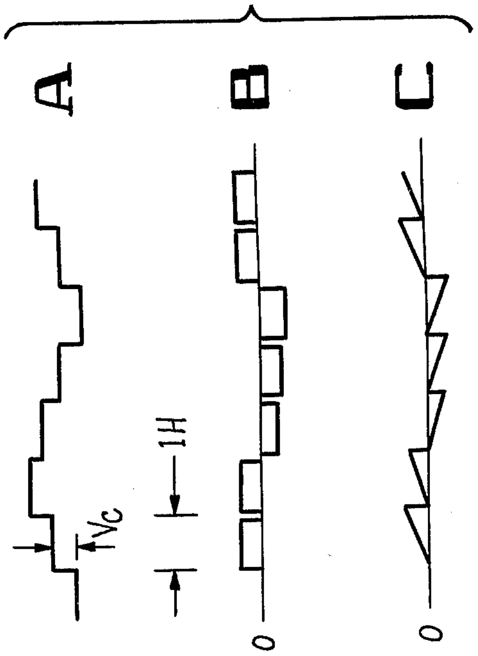
FIG. 10 (A–C) is a series of waveforms further useful in understanding the sample switch, clamps and error transfer switch of FIG. 5 and also the overall system of FIG. 1.

Referring now to FIG. 5 of the drawings wherein the block 44 of FIG. 2 is shown in greater detail. Reference will also be made to the waveforms of FIG. 10 and again to those of FIG. 8. The first and second ramps of FIGS. 8(C) and 8(F) are applied to respective switches 84 and 86 that are closed upon receipt of a ramp sample pulse (FIG. 7(G)) at block 82. The ramp sample pulse applied to block 82 is also applied to a buffer 130 from which it is routed as the ramp stop pulse having the same duration as the ramp sample pulse to the ramp generator (FIG. 42). When the sample switches 84 and 86 are closed the voltage level of each respective ramp waveform is applied to capacitors 88 and 90, respectively. An exemplary voltage waveform on either of the two capacitors is shown in FIG. 10(A). It will be appreciated that the voltage levels on each capacitor will not have the same absolute magnitude because the ramps are 180° out of phase with each other. A new sample is taken every horizontal line during the burst period. Unit gain buffer amplifiers 92 and 94 apply the voltage on capacitors 88 and 90 to series capacitors 96 and 98, respectively. A pair of switches 106 and 108 which connect capacitors 96 and 98 to ground when clamp switch block 104 receives a horizontal sync pulse (FIG. 10(B)) as a clamp signal. Further unit gain amplifiers 100 and 102 are connected between the other side of switches 106 and 108 and the transfer switches described below. Referring to FIG. 10(A) and (B), the horizontal sync pulse which acts as a clamp signal occurs prior to the burst envelope and thus prior to the sample. When switches 106 and 108 are closed a subtraction takes place and the voltage present at the switch side of the capacitors 96 and 98 is the difference between successive voltage samples on capacitors 88 and 90, respectively. Thus the waveform at the output of amplifiers 100 or 102 is similar to that of FIG. 10(B). While it is convenient to use the horizontal sync signal as a clamp since it is available in the VTR readily, other means for providing a clamping signal could be used.

Figure 9:
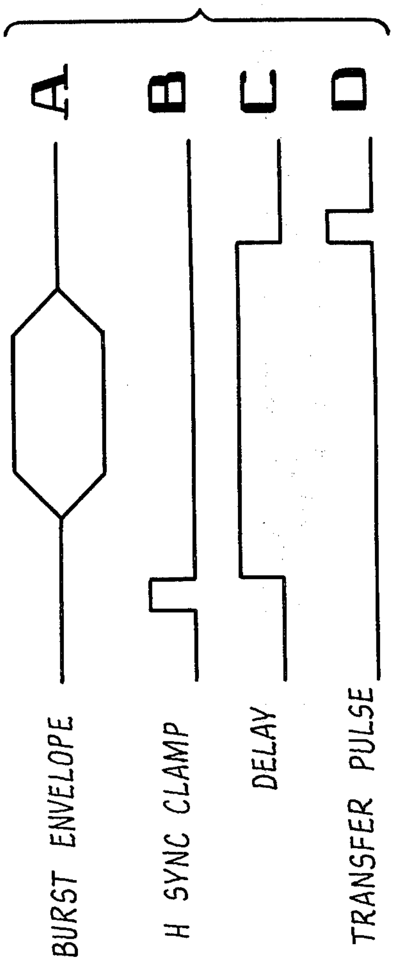
FIG. 9 (A–D) is a series of waveforms useful in understanding the sample switch, clamps and error transfer switch of FIG. 5.

The horizontal sync clamping signal is also applied to a delay 110 which can be a monostable multivibrator, for example, to provide a delay such as shown in FIG. 9(C) for providing a delayed transfer pulse as shown in FIG. 9(D). Subject to certain other logic functions this transfer pulse operates transfer switch 120 when an error transfer select No. 1 or No. 2 pulse is present in order to close switch 122 or 124 and thus apply the difference signal from the output of amplifier 100 or 102 to capacitor 126 where it is stored from line to line and applied to unitary gain buffer amplifier 128 to provide the velocity error detector outpupt to block 28 of FIG. 2. The output of amplifier 128 is shown in FIG. 10(B). That velocity error voltage of FIG. 10(B) is applied to the voltage controlled bi-directional current source 28 of FIG. 1 to provide the ramp voltages at capacitor 30 of FIG. 1. These ramp voltages which are then applied to the chrominance error detector 26 of FIG. 1 are shown in FIG. 10(C).

Transfer switch 120 selects the difference voltage from either amplifier 100 or amplifier 102 depending on which voltage reflects valid data as determined by the error transfer select signals 1 or 2. Unless one of the two channels contains a different signal based on the retrace portion of one of the ramp waveforms then both of the channels will contain the same information since the slopes of ramp No. 1 and ramp No. 2 are intended to be as identical as possible. The window logic arrangement described in FIG. 4 assures that the transfer switch will select the channel containing valid data for use as the velocity error voltage.

In a typical practical VTR there are further qualifications on the updating of the voltage on capacitor 126 and thus certain logic functions are connected between the delay 110 and transfer switch 120. Delay 110 is connected as one input to NAND gate 112. The NAND gate further receives the output of a pulse generator 116 which receives the head switching signal waveform. Pulse generator 116 generates a pulse long enough to block the next transfer pulse from delay 110 so that capacitor 126 is not updated following a head switch. Such data following a head switch would not be valid unless the approach used in FIG. 6 to be described is utilized. Due to the 1H delay, the affected line is the line immediately preceding a head switch. The NAND gate 112 also receives the output of a further pulse generator 114 that receives a pulse when each one line delayed burst occurs. Such pulses are available in the typical VTR from conventional drop out correction circuitry. Pulse generator 114 generates pulses of approximately 65 microsecond length, which is about the length of one horizontal line and applies them to NAND gate 112. Thus, in the absence of bursts the voltage on capacitor 126 is not updated. Obviously, if no new bursts are present the information at amplifiers 100 and 102 may be erroneous. The output of NAND gate 112 is applied to a NOR gate 118 which also receives an input which may be designated "VTR functions confirmed" which is normally low if the VTR is operating normally. For example, this input could monitor the locking of the servo loops in the VTR and confirmation that the VTR is in its play mode and that a color recording is being played. The output of NOR gate 118 is applied to the transfer switch 120. Thus, if the VTR is operating normally the output of delay 110 is normally applied to transfer switch 120, except during the first line following a head switch.

It will be appreciated that it is not critical that that same off-tape burst zero crossing be used for sampling the reference burst at each line. It is not critical because essentially the same sample of each ramp will occur for consecutive zero crossings of the same burst.

It will also be appreciated that although various switches are shown in the drawings and described in the specification in a general block and schematic form that suitable high speed switching means such as solid state devices will be used in practice.

Those of ordinary skill in the art will also appreciate that other means may be provided for the generation of the ramps and windows as shown in FIG. 8(C), 8(F), 8(G) and 8(H). For example, multiplication of the referenced subcarrier and division of the multiplied subcarrier could be used to generate the desired waveforms. Furthermore, it is not absolutely essential that the windows of FIGS. 8(G) and 8(H) be precisely centered on the linear portion of the ramp waveforms 9(C) and 9(F). So long as there is enough of the linear portion of the ramp available on each end to account for the maximum velocity error. In general, each ramp, when two ramps are used, should be longer than 180° of the subcarrier by a time equal to twice the maximum velocity error expected to be encountered in one horizontal line of the VTR. Obviously, more than two ramps could be used. For example, instead of using two ramps 180° out of phase with respect to each other, three ramps could be used spaced at 120° with appropriate windows. This would necessitate a third channel in the circuitry of FIG. 5, however, and would likely not be desirable from a cost standpoint. Moreover, other variations of periodic waveforms and "window" or gating pulses will be apparent to those of ordinary skill in the art. The phase or time comparison arrangement being a type of four quadrant phase detector with means for avoiding ambiguity. Such variations on the disclosed embodiments are intended to be within the scope of the present invention.

The invention is not limited to use in VTRs having a one line delay in the signal path. In the absence of such a delay, the velocity error signal would be applied to correct the next succeeding line. Such a correction is still meaningful and an improvement over certain types of prior art velocity compensation systems. The invention is not limited to the use of a continuous reference subcarrier. A gated reference subcarrier can be used provided that the reference subcarrier is present during the required sampling intervals.

Those of ordinary skill in the art will appreciate that the invention disclosed herein can be modified and is therefore not limited to the precise embodiments disclosed. The invention is therefore to be limited only by the scope of the appended claims.

I claim:

1. In a video tape recorder adapted for reproducing a recorded composite color video signal, said recorder receiving a reference color subcarrier signal, said recorder reproducing an uncorrected composite color video signal having line-to-line velocity errors and time base errors, velocity error detector apparatus comprising:

burst separator means receiving said uncorrected composite color video signal for separating the reproduced color subcarrier bursts from said video signal, means for generating a sample signal in response to a zero crossing in each of said reproduced color subcarrier bursts, means receiving said reference color subcarrier for generating a plurality of repetitive signals at the reference color subcarrier rate, and means receiving said sample signals for non-ambiguously sampling said repetitive signals as a four quadrant phase detector.

2. The combination of claim 1 wherein said means for non-ambiguously sampling said repetitive signals includes:

means receiving said reference subcarrier for generating a plurality of window signals at the reference subcarrier rate, said window signals corresponding in number and relative phase to said repetitive signals and having a width and phased with respect to the non-retrace portions of corresponding repetitive signals to provide widths of said non-retrace portions outside said windows at least as large as the maximum line-to-line velocity error of the video tape recorder.

3. The combination of claim 2 wherein said means for non-ambiguously sampling said repetitive signals further includes:

sampling means receiving said repetitive signals and said sample signals for sampling and storing the value of each repetitive signal at the time of a sample signal, subtraction means receiving said stored values for generating and storing each of the differences between said stored values in consecutive lines, and means for selecting as the error signal output the stored difference value generated from a repetitive signal of which the corresponding window signal is coincident with said sample signal.

4. The combination of claim 2 wherein said plurality of repetitive signals comprise two trains of ramp signals staggered in phase by 180° of the reference subcarrier cycle and said plurality of window signals comprise two trains of gating pulses staggered in phase by 180° of the reference subcarrier cycle.

5. The combination of claim 1 wherein said repetitive signals are ramp signals.

6. The combination of claim 1 wherein said error detecting means includes:

means for generating a sample signal in response to a zero crossing in each of said reproduced color subcarrier bursts, means receiving the reference subcarrier signal for generating first and second ramp signals, having retrace portions, at the reference subcarrier rate, and staggered in phase by 180° of a subcarrier cycle, and means receiving the reference subcarrier signal for generating first and second window signals at the reference subcarrier rate and staggered in phase by 180° of a subcarrier cycle and having widths and phased relative to the non-retrace portions of the corresponding first and second ramp signals to provide widths of said non-retrace portions outside corresponding window signals at least as large as the maximum line-to-line velocity error of the video tape recorder.

7. The combination of claim 6 wherein said error detecting means further includes:

sampling means receiving said ramp signals and said sample signals for sampling and storing the value of each ramp signal at the time of a sample signal, subtraction means receiving said stored values for generating and storing the differences between said stored values in consecutive lines, and means for selecting as the error signal output the stored difference value generated from a ramp signal of which the corresponding window signal is coincident with said sample signal.

8. In a video tape recorder adapted for reproducing a recorded composite color video signal, said recorder receiving a reference color subcarrier signal, said recorder reproducing an uncorrected composite color video signal having line-to-line velocity errors and time base errors, said recorder further including a time base error corrector system of a type including an electronically variable delay line adapted for insertion in the reproduced composite color video signal path for varying the phase of the video signal in accordance with an error signal applied to the control input, the combination comprising means for delaying by approximately one horizontal line the reproduced composite color video signal applied to said electronically variable delay line, error detecting means receiving said reference subcarrier signal and said uncorrected composite color video signal, each of said signals independent of said delaying means, for comparing the color subcarrier bursts of said composite color video signal to said reference color subcarrier signal to generate an error signal output corresponding to each incremental change in phase error between said reproduced color subcarrier bursts and said reference color subcarrier bursts in succeeding horizontal video lines, means receiving said error signal output for generating a ramp signal output proportional to said error signal, and means for applying said ramp signal output to the control input of said electronically variable delay line.

* * * * *

UNITED STATES PATENT OFFICE

CERTIFICATE OF CORRECTION

PATENT NO. : 3,921,202

DATED : November 18, 1975

INVENTOR(S) : Bert H. Dann et al

It is certified that error appears in the above-identified patent and that said Letters Patent are hereby corrected as shown below:

Column 3, line 30, "dealy" should read -- delay --.

Column 6, line 48, "7(B) and 8(A)" should read -- 6(B) and 7(A) --.

Column 8, line 1, "and" should read -- of --.

Column 10, lines 6 and 9, "10(B) and "10(A)" should read -- 9(B) -- and -- 9(A) --.

line 32, "outpupt" should read --output --.

line 44, "different" should read -- difference --.

Column 11, line 38, "9(C) and 9(F)" should read -- 8(C) and 8(F) --.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*